United States Patent [19]

Sugaya

[11] Patent Number: 4,631,606
[45] Date of Patent: * Dec. 23, 1986

[54] SYSTEM FOR DETECTING THE POSITION OF A READ-WRITE HEAD ON A DISK RECORDING MEDIUM HAVING SERVO SECTORS WITH THREE OR MORE SERVO PATTERNS

[75] Inventor: Toshihiro Sugaya, Tokyo, Japan

[73] Assignee: Tokyo Shibaura Denki Kabushiki Kaisha, Kawasaki, Japan

[*] Notice: The portion of the term of this patent subsequent to Jul. 8, 2003 has been disclaimed.

[21] Appl. No.: 586,440

[22] Filed: Mar. 5, 1984

[30] Foreign Application Priority Data

Mar. 11, 1983 [JP] Japan ................................ 58-40370

[51] Int. Cl.⁴ ..................... G11B 21/08; G11B 21/10
[52] U.S. Cl. ....................................... 360/78; 360/77; 360/135
[58] Field of Search ................... 360/75, 77, 78, 48, 360/49, 135; 369/43, 44, 32, 33

[56] References Cited

U.S. PATENT DOCUMENTS

| | | | |
|---|---|---|---|
| 4,027,338 | 5/1977 | Kril | 360/77 |
| 4,163,265 | 7/1979 | van Herk et al. | 360/77 |
| 4,238,809 | 12/1980 | Fujiki | 360/77 X |
| 4,390,912 | 6/1983 | Hertrich et al. | 360/78 |
| 4,400,747 | 8/1983 | Siverling | 360/77 |
| 4,464,689 | 8/1984 | Propst | 360/78 |
| 4,499,511 | 2/1985 | Sugaya | 360/78 |

FOREIGN PATENT DOCUMENTS

| | | | |
|---|---|---|---|
| 0068124 | 1/1983 | European Pat. Off. | 360/77 |
| 0088554 | 9/1983 | European Pat. Off. | 360/78 |
| 2808404 | 2/1978 | Fed. Rep. of Germany | 360/77 |
| 51131607 | 11/1976 | Japan . | |
| 58-62870 | 4/1983 | Japan | 360/78 |
| 58-146058 | 8/1983 | Japan | 360/75 |

OTHER PUBLICATIONS

IBM TDB vol. 20, No. 8, "Sector Servo Method" Deremer et al., Jan. 1978, pp. 3243-3247.
IBM TDB vol. 18, No. 10 "Track Following Servo System" Oswald, Mar. 1976, pp. 3424-3425.
IBM TDB vol. 22, No. 12, "Quad Burst Servo Pattern" Liu, May 1980, pp. 5436-5438.

Primary Examiner—Raymond F. Cardillo
Assistant Examiner—Steven R. Garland
Attorney, Agent, or Firm—Oblon, Fisher, Spivak, McClelland, Maier

[57] ABSTRACT

In order to perform a high-speed seek of a target track while the increase of area of servo sectors is minimized, each servo sector of a disk recording medium has K (an integer of 3 or more) servo patterns. The K servo patterns consist of a first servo pattern consisting of two-phase first and second pairs of alternate pattern arrays having a period of four tracks; a second servo pattern consisting of a pair of alternate pattern arrays having a period of $2^{K+1}$ tracks and displaced by $2^{K-1}$ tracks with respect to each other; and a kth servo pattern consisting of an alternate pattern array having a period of $2^{K-k+3}$ (k includes all integers of not less than 3 and not more than K) tracks and displaced by $2^{K-k+1}$ tracks with respect to a (k−1)th servo pattern. K is set to 3 for a head speed of 16 tracks/sector. In this case, three servo patterns consisting of seven pattern arrays are provided. Similarly, K is set to 4 for a head speed of 32 tracks/sector. In this case, four servo patterns consisting of eight pattern arrays are provided. With such a configuration of servo patterns, the number of signal detectors for detecting servo signals corresponding to the servo pattern arrays, which are provided in a servo tracking apparatus, can be minimized.

7 Claims, 8 Drawing Figures

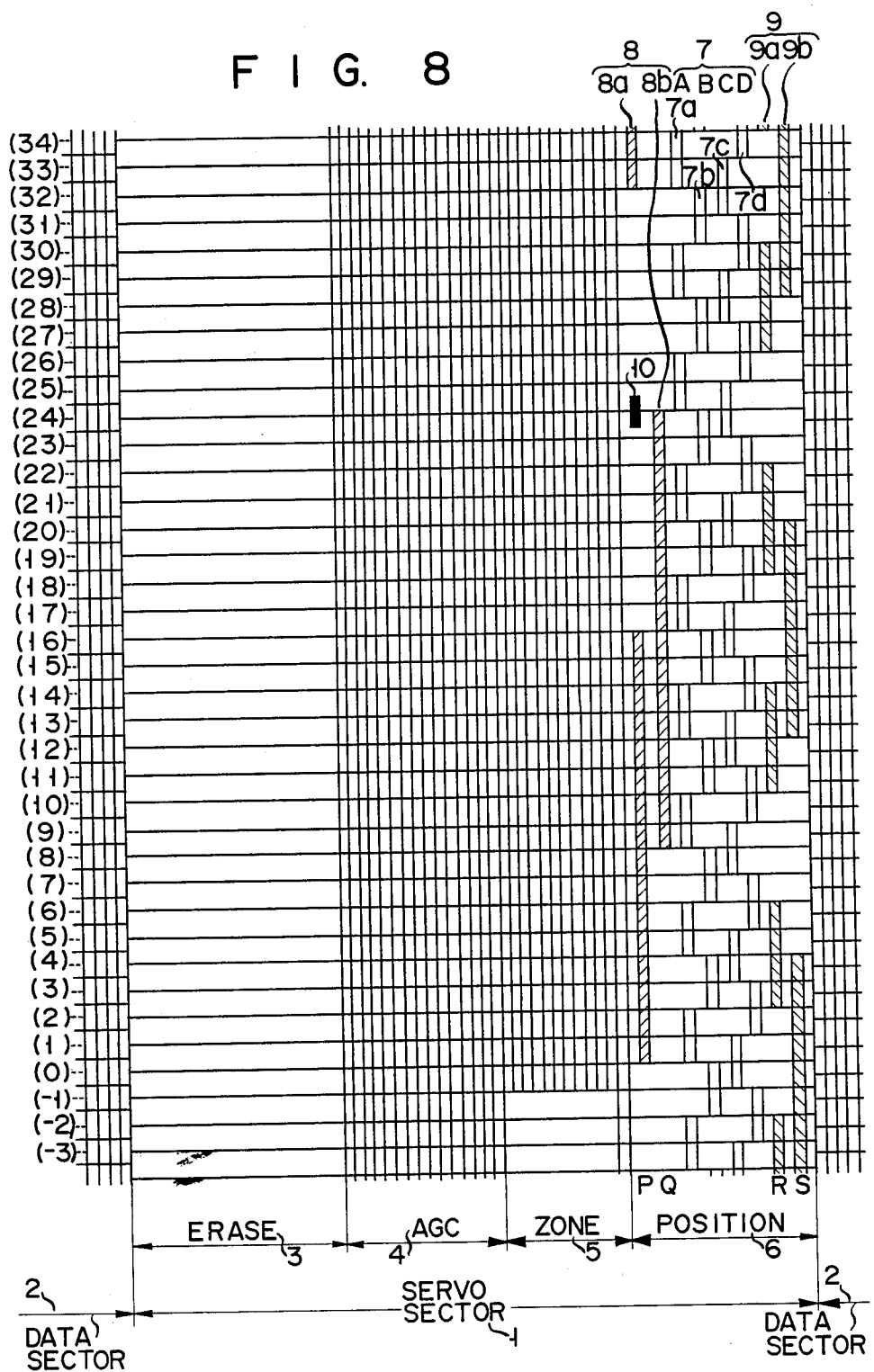

SYSTEM FOR DETECTING THE POSITION OF A READ-WRITE HEAD ON A DISK RECORDING MEDIUM HAVING SERVO SECTORS WITH THREE OR MORE SERVO PATTERNS

BACKGROUND OF THE INVENTION

The present invention relates to a system for detecting the position of a read-write head in a disk memory apparatus such as a magnetic disk apparatus or an optical disk apparatus.

Magnetic and optical disks have been widely used as memory devices. A large number of concentric data tracks are formed on the disk. In order to access a selected track, a read-write head must be quickly and accurately placed on the selected track. A tracking servo system is used for this purpose.

Various types of data surface servo systems have been developed wherein servo data is recorded on the data surface. A typical example is an embedded servo system wherein a disk data surface is divided into a plurality of sectors (e.g., 32 sectors), and servo data is recorded on servo sectors each embedded between two adjacent data sectors. According to the embedded servo system, the disk and servo data processing circuit may be simple in construction compared with any other data surface servo systems.

With the embedded servo system, since the servo data is accessed only from the servo sectors, continuous positioning control of the head cannot be performed. For this reason, when the head is moved at high speed, position signals based on the servo data are obtained incompletely. As a result, the head speed control and head positioning with respect to a target track will not be performed. Therefore, the head speed in the radial direction of the disk is limited.

In my copending U.S. patent application No. 469,144, filed Feb. 23, 1983, now U.S. Pat No. 4,499,511, dated Feb. 12, 1985 assigned to the same assignee as this application and entitled "SYSTEM FOR DETECTING POSITION OF A READ-WRITE HEAD IN SEEK OPERATION ON A DISK MEMORY HAVING DATA AND SERVO SECTORS", embedded servo sectors are disclosed which have such servo information patterns formed thereon as to enable the head to accurately seek a target track at a speed of less than 4 tracks/sector, 8 tracks/sector or 16 tracks/sector. In order to shorten the seek time, the speed of the head must be increased. For this purpose, the number of servo data patterns formed in the servo sector must be increased. An increase in the number of servo data patterns, formed in the servo sector, results in an increase in the servo sector region. In other words, the data sector region is decreased so that the recording density of data is lowered. An additional disadvantage is that a complex servo control circuit is required.

In the servo sector (FIG. 13) of the above-mentioned copending application, which is adapted for the head speed of less than 16 tracks/sector, three types of servo patterns are formed which have periods of four, eight and sixteen servo tracks, respectively. Each of the periodic servo patterns has a pair of alternate pattern arrays having the same period and arranged in a staggered fashion. The basic servo pattern having a period of four tracks is formed in a two-phase manner, so that eight servo pattern arrays are arranged. According to the teaching of this example, in order to adapt for the head speed of 32 tracks/sector, a pair of alternate arrays having a period of 32 tracks is added in the servo sector, so that 10 servo pattern arrays are required. A detecting means is provided for each array of the servo patterns, thus complicating the servo circuit.

SUMMARY OF THE INVENTION

It is an object of the present invention to provide a disk recording medium of the embedded servo-system suitable for high-speed seek operation with a minimized increase of servo sector regions.

It is another object of the present invention to provide a head position-detecting system using an embedded servo system capable of performing a high-speed seek of a target track.

According to the present invention, in a disk recording medium having a plurality of data sectors each having concentric data tracks, and servo sectors each having concentric servo tracks and embedded between two adjacent data sectors, each of the servo sectors has K (an integer of not less than 3) servo patterns which consist of a first servo pattern consisting of a first pair of alternate pattern arrays having a period of four tracks and arranged in a staggered fashion, and a second pair of alternate pattern arrays having a period of four tracks and arranged in a staggered fashion, the first and second pairs of alternate pattern arrays being displaced by one track with respect to each other; a second servo pattern consisting of a pair of alternate pattern arrays each having a period of $2^{K+1}$ tracks and displaced by $2^{K-1}$ tracks with respect to each other; and a kth servo pattern consisting of an alternate pattern array having a period of $2^{K-k+3}$ (k includes all integers of not less than 3 and not more than K) tracks and displaced by $2^{K-k+1}$ tracks with respect to the (k−1)th servo pattern.

In a high-speed seek, the head speed of not more than 16 tracks/sector or 32 tracks/sector is practical. Both K and k are set to 3 for the head speed of not more than 16 tracks/sector. Therefore, in this case, three types of servo patterns are formed in the servo sector. The second servo pattern consisting of a pair of alternate pattern arrays having a period of 16 tracks and displaced by four tracks with respect to each other. The third servo pattern consists of an alternate pattern array having a period of eight tracks and displaced by two tracks with respect to the second servo pattern. When K=k=3, the servo patterns have seven pattern arrays.

In order to obtain a servo sector adapted for a head speed of not more than 32 tracks/sector, K is set to 4, so that k includes 3 and 4. In this case, four types of servo patterns are formed. The second servo pattern consists of a pair of alternate pattern arrays having a period of 32 tracks and displaced by eight tracks with respect to each other. The third servo pattern consists of an alternate pattern array having a period of 16 tracks and displaced by four tracks with respect to the second servo pattern. The fourth servo pattern consists of an alternate pattern array having a period of eight tracks and displaced by two tracks with respect to the third servo pattern. When K=4, the servo patterns have eight pattern arrays.

In order to perform a high-speed seek of a target track, according to the present invention, the number of servo patterns formed in the servo sectors can be minimized, and thus the decrease in data storage capacity is minimal. The tracking servo system for placing the head on the target track requires detectors to detect servo signals, reproduced by the head, which correspond to the servo pattern arrays formed in the servo sectors, respectively. According to the present invention, the number of signal detectors required in the servo system can also be minimized.

BRIEF DESCRIPTION OF THE DRAWINGS

FIG. 8 shows a servo sector having servo patterns embodying the present invention, where K=4.

DESCRIPTION OF THE PREFERRED EMBODIMENT

Figure 1:
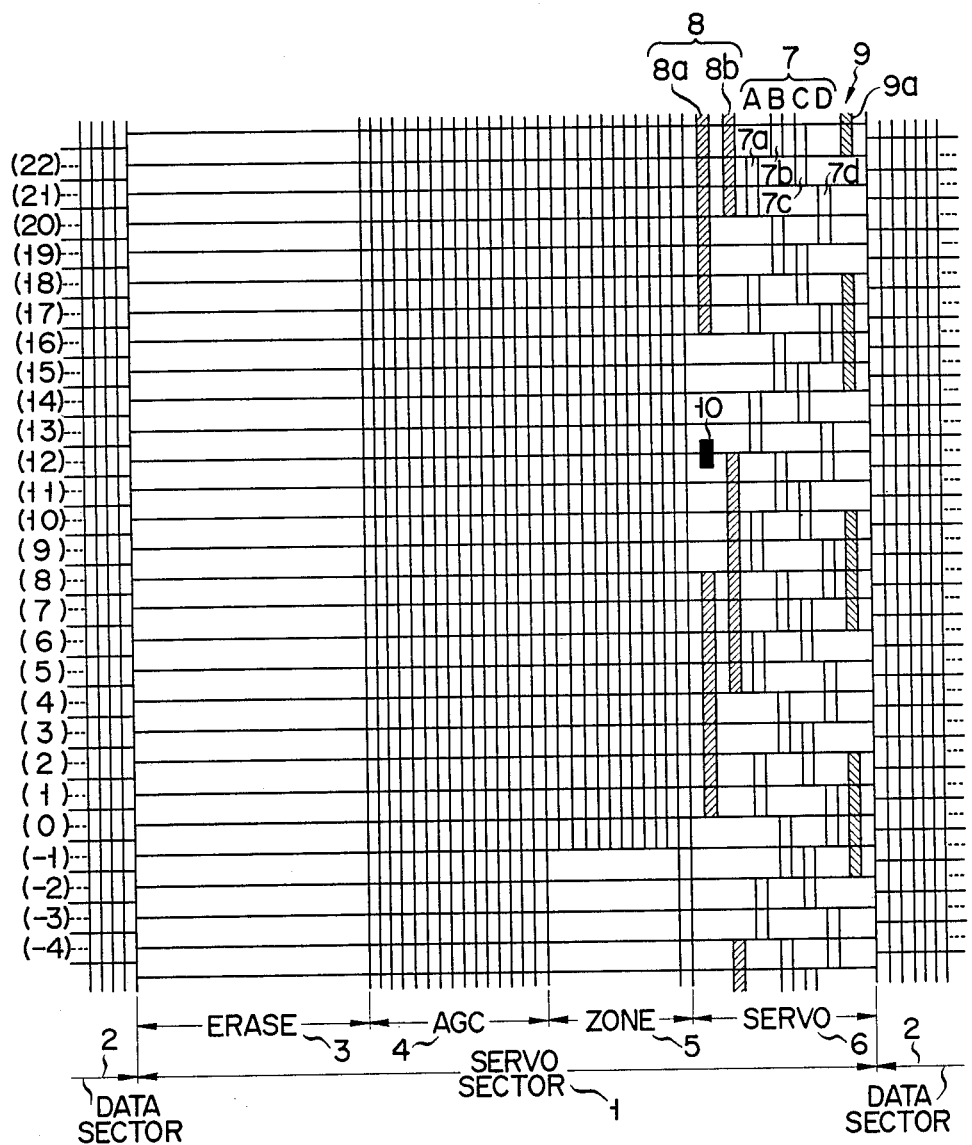
FIG. 1 shows a servo sector having servo patterns embodying the present invention.

Referring to FIG. 1, there is illustrated a servo sector having servo information patterns of the present invention which enables a read-write head to seek a target track at a speed of not more than 16 tracks/sector. Reference numerals 1 and 2 denote servo sectors and data sectors, respectively. Concentric tracks of the servo sector 1 are offset from those of the data sector 2 by ½ track width as shown.

The servo sector 1 has an erase section 3 which is used for servo sector detection. The erase section has a maximum erase time in one track of the magnetic disk. Subsequently to the erase portion 3, are formed an AGC (Automatic Gain Control) signal section 4 for extracting an AGC signal; a zone section 5 for distinguishing a guard zone provided at the outer portion of the disk from a data zone to detect the 0th track; and a servo information-pattern section 6 for detecting the position of a read-write head 10 along the radial direction of the disk.

Three servo information patterns 7, 8 and 9 are embedded in the servo pattern section 6 to achieve a head speed of not more than 16 tracks/sector. The first servo pattern 7 consists of a first pair of alternate dibit pattern arrays 7a and 7b having a period of four tracks and arranged in a staggered fashion, and a second pair of alternate dibit pattern arrays 7c and 7d having a period of four tracks and arranged in a staggered fashion. The first and second pairs are formed in two phases with a displacement of one track therebetween. The second servo pattern 8 consists of a pair of alternate dibit-pattern arrays 8a and 8b having a period of 16 tracks and displaced by 4 tracks with respect to each other. The third servo pattern 9 consists of an alternate dibit-pattern array 9a having a period of eight tracks and displaced by two tracks with respect to the dibit-pattern array 8a of the second servo pattern 8. In the example shown in FIG. 1, the second and third servo patterns 8 and 9 are formed at opposite sides of the first servo pattern 7. In other words, the second servo pattern arrays 8a and 8b are formed at one side of the first servo pattern 7. Alternatively, the servo pattern arrays 8a and 8b may be formed on opposite sides of the first servo pattern 7.

As shown in FIG. 1, according to the present invention, only seven pattern arrays may be provided to achieve a seek speed of not more than 16 tracks/sector. With this arrangement, the increase in the area of servo sector 1 can be minimized. When the read-write head 10 is accurately positioned on a data track, the head 10 traces the respective halves of adjacent servo tracks in the servo sector 1.

Figures 2, 4:
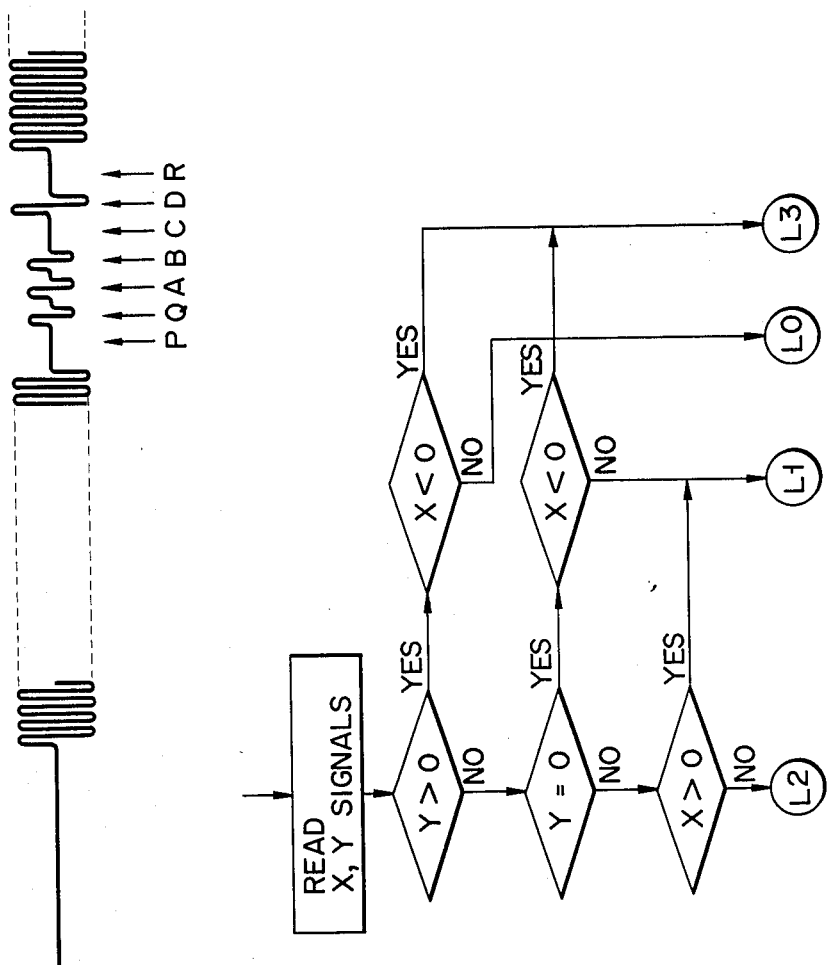
FIG. 2 shows the waveform of an output signal of a read-write head in the servo sector.
FIG. 4 is a flow chart for explaining the operation of detecting a track section in four consecutive track sections within which the head is located.

When the head 10 is positioned on the 12th data track as shown, an output signal of the head 10 is such as shown in FIG. 2. The output signal from the erase section 3 is zero, and an AC signal is obtained from the AGC signal section 4. In addition, position signals P, Q, A, B, C, D and R are respectively obtained from the servo pattern arrays 8a, 8b, 7a, 7b, 7c, 7d and 9a of the servo pattern section 6. Since the head 10 traces the respective halves of two adjacent servo tracks, the amplitude of a position signal obtained at a position in which only one of adjacent tracks has dibit pattern is half the amplitude of position signal obtained at a position in which the two adjacent tracks have servo patterns. In the case shown in FIG. 2, the position signals P, C and R are zero, and the position signals Q, A and B have an amplitude half that of the position signal D. It will be evident that the relative amplitude relationship between the position signals varies with the position of head 10.

According to the present invention, the track position under head 10 can be detected very precisely at a speed of not more than 16 tracks/sector in accordance with the position signals obtained from the first to third servo patterns 7 to 9, thereby performing a high-speed seek of target track.

The description will now be made of the detection of a head position at a head speed of not more than 16 tracks/sector. The position signals A, B, C, D, P, Q and R can be extracted in the same manner as described in the prior application described previously.

Other position signals X and Y are obtained from the position signals A, B, C and D based on the first servo pattern 7 as follows:

$$X = A - B$$

$$Y = D - C$$

The position signals serve to detect a track section within which the head is positioned. Still other position signals U and V are obtained from the position signals X and Y as follows:

$$U = X + Y$$

$$V = X - Y$$

Figure 3:
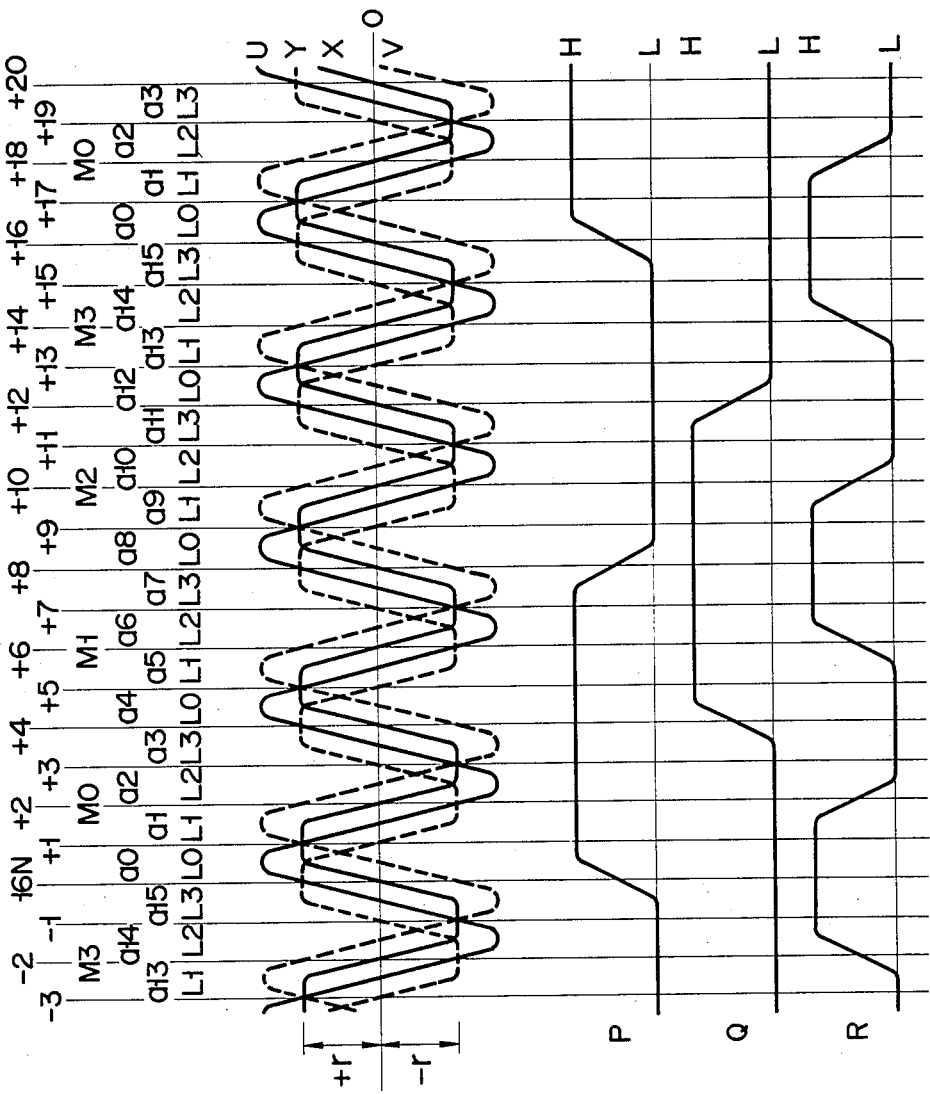
FIG. 3 shows waveforms of position signals obtained from the servo information patterns shown in FIG. 1.

The position signals U and V are used to calculate a precise head position within the detected track section. The position signals X, Y, U, V, P, Q, and R are periodic functions of the head position, as shown in FIG. 3. The position signals shown in FIG. 3 are illustrated as having optimum waveforms which are obtained when the head moves from the outer portion to the inner portion of disk at low speed.

Figure 5:
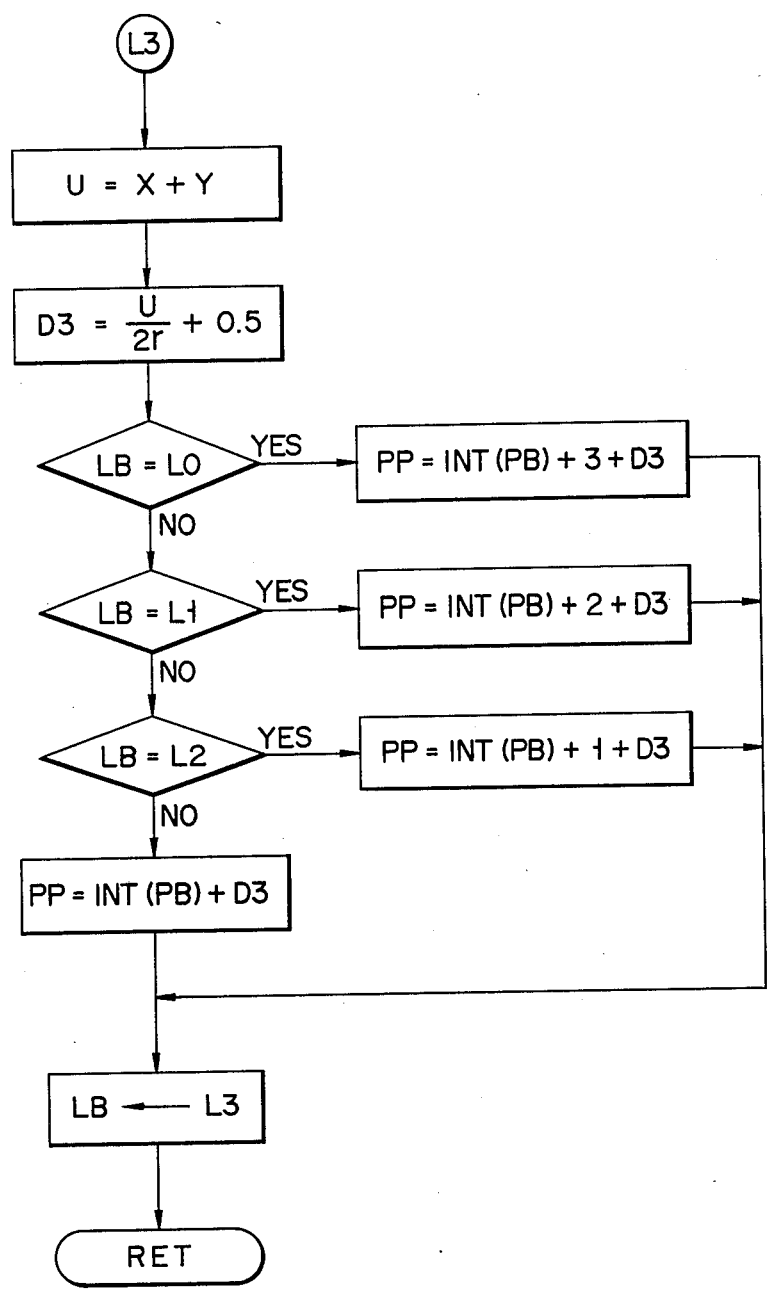
FIG. 5 is a flow chart for explaining the operation of detecting the position of the head within the detected track section.

Each of signals X, Y, U and V has a period of four tracks. According to these signals, a track section of four consecutive track sections L0, L1, L2 and L3 within which the head 10 is positioned is detected, and the head position in the detected track is calculated. More specifically, as shown in the flow chart of FIG. 4, the track section within which the head is positioned is detected in accordance with the polarities of the position signals X and Y. The head position in the detected track section is calculated using the position signal U or V, which varies linearly within the detected track section. For example, assume that the detected track section is the section L3. As shown in the flow chart of FIG. 5, the position signal $U(=X+Y)$, which varies linearly within the track section L3, is used to calculate the present position D3 of head within the track section L3 such that $U/2r+0.5$, where 2r is a peak-to-peak value of the position signals X and Y. The present position PP of the head on the disk is calculated in accordance with the track section LB of the previous servo sector, an integer portion of the head position in the section LB i.e., track number INT(PB) of the track section LB, the number of tracks between the previous track section LB and the track section L3, and the head position D3 of the track section L3 calculated as described above.

In this manner, when the seek speed is not more than 4 tracks/sector, the present head position on the disk can be calculated with high precision in accordance with the position signals X, Y, U and V. However, when the seek speed is ranged from 4 tracks/sector to 16 tracks/sector, the present head position cannot be detected only by the first servo pattern 7.

With this invention, the present head position PP can be detected over 16 track sections a0 to a15 using the position signals P, Q and R as well as the position signals X, Y, U and V.

The position signals P and Q, obtained from the second servo pattern 8, have a period of 16 tracks and are overlapped with each other by four tracks, as shown in FIG. 3. Therefore, if both the position signals P and Q have an optimum rectangular waveform, a section M0 having tracks 16N to 16N+3, a section M1 having tracks 16N+4 to 16N+7, a section M2 having tracks 16N+8 to 16N+11 and a section M3 having tracks 16N+12 to 16N+15 can be detected by level descrimination of the position signals P and Q. However, in practice, the position signals P and Q reproduced by head 10 are distorted to have trapezoidal waveforms, as shown in FIG. 3. Thus, in order to achieve an accurate detection of the sections M0 to M3, the ramp portions of the position signals P and Q must be excluded from the level detection.

The third servo pattern 9 is used to detect the track section at the ramp portion of the position signal P or Q. The position signal R, obtained from the third servo pattern 9, has a period of eight tracks and is overlapped the position signal P over two tracks. For this reason, the position signal R is necessarily high or low at the ramp portions of the position signals P and Q.

One of the sections M0 to M3, which has the four track sections L0 to L3, is detected by the position signals P, Q and R which have the signal level relationship described above. Furthermore, one of the track sections L0 to L3 in the detected four-track section can be detected by the position signals X and Y. Namely, one of 16 tracks a0 to a15 can be accurately detected.

The following table illustrates the level relationship between the signals P, Q and R with respect to the sections M0 to M3, L0 to L3 and a0 to a15.

TABLE

| Section | | | Signal P | Signal Q | Signal R |
|---|---|---|---|---|---|
| M0 | L0 | a0 | not L | L | H |
| | L1 | a1 | H | L | not L |
| | L2 | a2 | H | L | not H |
| | L3 | a3 | H | not H | L |
| M1 | L0 | a4 | H | not L | L |
| | L1 | a5 | H | H | not H |
| | L2 | a6 | H | H | not L |
| | L3 | a7 | not L | H | H |
| M2 | L0 | a8 | not H | H | H |
| | L1 | a9 | L | H | not L |
| | L2 | a10 | L | H | not H |
| | L3 | a11 | L | not L | L |
| M3 | L0 | a12 | L | not H | L |
| | L1 | a13 | L | L | not H |
| | L2 | a14 | L | L | not L |
| | L3 | a15 | not H | L | H |

Levels "not H" and "not L" in the table are levels at the ramp portions of signals P, Q and R, and indicate that each signal cannot be accurately detected to be high (H) or low (L) using a threshold value which is half the signal amplitude. By using the position signals P, Q and R and the position signals X and Y, the 16 track sections a0 to a15 can be properly discriminated, as shown in FIG. 6.

Figure 6:
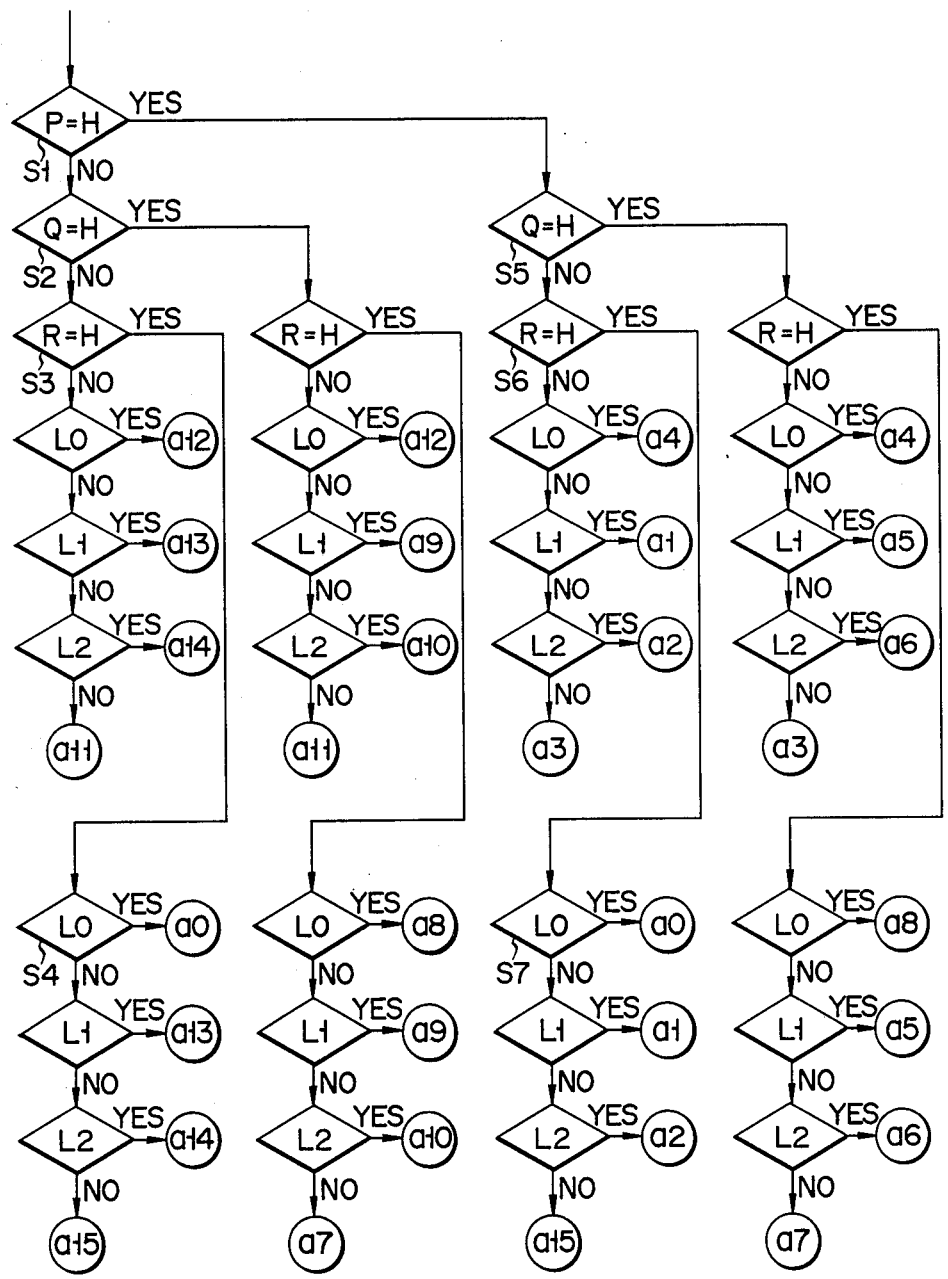
FIG. 6 is a flow chart for explaining the operation of detecting a track section in 16 consecutive track sections within which the head is positioned in accordance with position signals obtained from the servo data patterns shown in FIG. 1.

In the case of the flow chart of FIG. 6, the levels of signals P, Q and R are sequentially decided. Thereafter, one of the track sections L0 to L3 is detected in accordance with the signals X and Y. As a result, one of the track sections a0 to a15 is detected. A typical operation of track section detection will be described below. For example, in the case of track section a0, the level of signal P is not L and the signals Q and R are low and high, respectively. Since the level of the signal P is not L, there is a possibility that the signal P is detected as being low, on the one hand and as being high, on the other hand. Therefore, when the signal P is decided to be low in step S1, the operation advances from step S2 to step S4. When the track section is decided to be L0 by the signals X and Y in step S4, the track section is detected to be a0. However, when the signal P is detected to be high in step S1, the operation advances from step S5 to step S7. When the track section is decided to be L0 in step S7, the track section is detected to be a0. In other words, the track section a0 is properly detected irrespective of the result of level decision of signal P in step S1. Then assume that the track section is $a_{11}$. In this case, the signal P is low, the signal Q is not L, and the signal R is low. In step S2, therefore, the signal Q may be decided to be high on the one hand or low on the other hand. However, irrespective of the result of the level decision of the signal Q, the steps following step S2 are the same as described above. As a result, the track section can be detected to be $a_{11}$ using the signals X and Y. It is readily understood that one of the track sections a0 to a15 can be detected by using the signals P, Q, R, X and Y. The present head position within the detected track section can be detected in the same manner as previously described.

Figure 7:
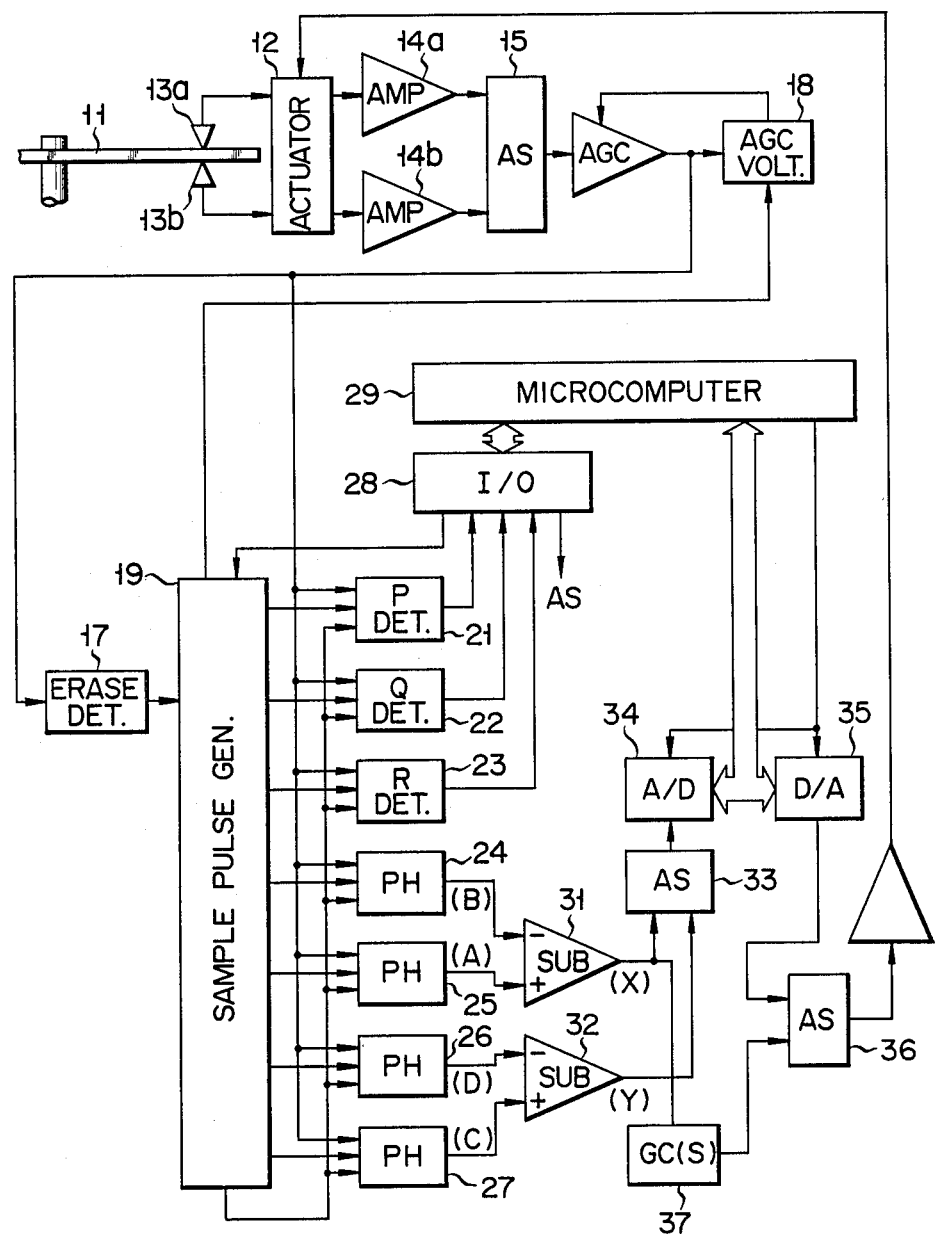
FIG. 7 is a block diagram of a tracking servo system for positioning the head on a target track of a disk recording medium having servo sectors of FIG. 1.

FIG. 7 is a block diagram of a servo system using the above-mentioned head position detecting system. This servo system is substantially the same as that of the prior application cited previously, which is adapted for a seek speed of 8 tracks/sector, except that a detector is added to detect the position signal R obtained from the third servo pattern. The servo system of the present invention can position the head on a target track at a seek speed of not more than 16 tracks/sector in accordance with the method described in the prior application. The operation of the servo system of FIG. 7 will be briefly described below.

Read-write heads 13a and 13b are associated with top and bottom surfaces, respectively, of a magnetic disk 11 which has the data sectors and servo sectors described above and is driven to rotate. These heads are actuated by an actuator or positioner 12. Signals reproduced from the servo sectors by heads 13a and 13b are applied to an analog switch 15 through amplifiers 14a and 14b, respectively. The analog switch 15 selectively supplies one of the output signals of amplifiers 14a and 14b to a gain-controlled amplifier 16 according to which surface of the disk is read or written. An output signal of gain-controlled amplifier 16 is applied to an erase detector 17, an AGC voltage generator 18, a P signal detector 21, a Q signal detector 22, an R signal detector 23, and peak hold (PH) circuits 24 to 27.

The erase detector 17 detects the erase section 3 formed at the beginning of the servo sector, or servo sector to drive a sample pulse generator 19. The AGC voltage generator 18 receives a reproduced AGC signal in response to sample pulse generator 19 to control the gain of gain-controlled amplifier 16.

The sample pulse generator 19 supplies sample pulses to detectors 21 to 23 and peak hold circuits 24 to 27 at proper points of time with reference to the detection timing of the erase section 3 by means of erase detector 17. As a result, the detectors 21 to 23 detect P, Q and R signals, respectively. The peak hold circuits 24 to 27 hold position signals B, A, D and C, respectively. Output signals of peak hold circuits 24 and 25 are supplied to a subtractor 31 to produce the position signal X (A−B). Similarly, output signals of peak hold circuits 26 and 27 are supplied to a subtractor 32 to produce the position signal Y (C−D).

The output signals of signal detectors 21 to 23 are supplied to a microcomputer 29 through an I/0 circuit 28 to be used in the track section decision processing as previously described. The output signals of subtractors 31 and 32 are selectively applied to an analog-to-digital (A/D) converter 34 through an analog switch 33. The A/D converter 34 converts the output signals of subtractors 31 and 32 into digital signals which are supplied to microcomputer 29 through data bus. The microcomputer 29 reads position signals X and Y to obtain the position signals U and V. The microcomputer 29 then detects the present head position at the seek speed of not more than 16 tracks/sector in accordance with the position signals X, Y, U, V, P, Q and R. Furthermore, the microcomputer 29 calculates the number of tracks up to a target track whose data is externally entered, and then reads out desired speed data corresponding to the calculated track number from a data table. The microcomputer then supplies to a digital-to-analog (D/A) converter 35, through the data bus, the speed information which represents the difference between the present speed and the desired speed.

The output signal of D/A converter 35 is used for head speed control and the output signal of subtractor 31 is used for head position control after the speed control. During the head speed control, the output signal of D/A converter 35 is supplied to actuator 12 through analog switch 36 to control the head speed. When the head approaches the target track with a distance of less than 0.5 track width therebetween, the servo system is switched from the speed control mode to the position control mode so that the output signal of subtractor 31 is supplied to actuator 12 through compensation circuit 37 and analog switch 36.

In the head position control mode, the control signal supplied from subtractor 31 to actuator 12 is switched in accordance with the target track on which the head is positioned. One of the signals +X, −X, +Y and −Y is supplied to actuator 12 in accordance with the target track. This can be achieved by varying the phases of the sample pulses supplied from sample pulse generator 19 to peak hold circuits 24 to 27, in response to an instruction from microcomputer 29. More specifically, the position signal +X is used for the target track 16N; −Y, for 16N+1; −X, for 16N+2; and +Y, According to the present invention, the head can be accurately positioned on the target track at a head speed of not more than 16 tracks/sector by using the three servo patterns consisting of seven pattern arrays, as shown in FIG. 1.

The practical head speed for the high-speed seek is 16 tracks/sector or 32 tracks/sector. According to the teaching of this invention, four types of servo information patterns consisting of eight pattern arrays suffices to adapt for the seek speed of 32 tracks/sector. In this case, the servo system may be arranged such that one signal detector is added to the servo system of FIG. 7.

FIG. 8 shows another servo sector using eight pattern arrays. This pattern array relates to the situation where K=4. The reading of this pattern follows in an analgous manner of the situation described in regard to FIG. 1 above.

What is claimed is:

1. A disk recording medium having a plurality of data sectors each having concentric data tracks and servo sectors each having concentric servo tracks and embedded between adjacent data sectors, characterized in that each servo sector has K (an integer of not less than 3) servo information patterns which consist of a first servo pattern consisting of a first pair of alternate pattern arrays having a period of four tracks and arranged in a staggered fashion, and a second pair of alternate pattern arrays having a period of four tracks and arranged in a staggered fashion, said first and second pairs of alternate pattern arrays being displaced by one track with respect to each other; a second servo pattern consisting of a pair of alternate pattern arrays having a period of $2^{K+1}$ tracks and displaced by $2^{K-1}$ tracks with respect to each other; and a kth servo pattern consisting of an alternate pattern array having a period of $2^{K-k+3}$ (k includes all intergers of not less than 3 and not more than K) tracks and displaced by $2^{K-k+1}$ tracks with respect to a (k−1)th servo pattern.

2. A medium according to claim 1, wherein K is 3.

3. A medium according to claim 1, wherein K is 4.

4. A medium according to claim 1, wherein said pair of alternate pattern arrays of said second servo pattern are formed at one side of said first servo pattern.

5. A medium, according to claim 1, wherein K is 3, and said second and third servo patterns are formed at opposite sides of said first servo pattern.

6. A medium, according to claim 1, wherein each of said servo patterns consists of a dibit pattern.

7. A tracking servo system for positioning a read-write head on a target track of a disk recording medium having a plurality of data sectors each having concentric data tracks and servo sectors each having concentric servo tracks and embedded between adjacent data sectors, each servo sector having K (an integer of not less than 3) servo patterns which consist of a first servo pattern consisting of a first pair of alternate pattern arrays having a period of four tracks and arranged in a staggered fashion, and a second pair of alternate pattern arrays having a period of four tracks and arranged in a staggered fashion, said first and second pairs of alternate pattern arrays being displaced by one track with respect to each other; a second servo pattern consisting of a pair of alternate pattern arrays having a period of $2^{K+1}$ tracks and displaced by $2^{K-1}$ tracks with respect to each other; and a kth servo pattern consisting of an alternate pattern array having a period $2^{K-k+3}$ (k includes all intergers of not less than 3 and not more than K) tracks and displaced by $2^{K-k+1}$ tracks with respect to a (k−1)th servo pattern, comprising:

head driving means for driving said read-write head in the radial direction of said disk recording medium;

detecting means for detecting servo signals, corresponding to said pattern arrays of said servo patterns from an output signal of said read-write head obtained at each of said servo sectors; and controlling means responsive to the servo signals from said detecting means for controlling said head driving means to position said read-write head on the target track.

* * * * *